United States Patent [19]

Arai

[11] 4,305,482

[45] Dec. 15, 1981

[54] CALIPER TYPE BRAKE FOR BICYCLES

[76] Inventor: Kenzo Arai, 2189, Sue Saya-cho, Ama-gun, Aichi-ken, 496, Japan

[21] Appl. No.: 94,769

[22] Filed: Nov. 16, 1979

[30] Foreign Application Priority Data

Nov. 20, 1978 [JP] Japan ............................ 53-160533

[51] Int. Cl.³ ............................................. B62L 1/12
[52] U.S. Cl. ............................. 188/24.19; 188/2 D; 188/72.9
[58] Field of Search ................. 188/24, 2 D, 72.9

[56] References Cited

U.S. PATENT DOCUMENTS 735,113 8/1903 Kellandet al. ....................... 188/24

FOREIGN PATENT DOCUMENTS

| 448016 | 1/1913 | France | 188/24 |
| 456287 | 8/1913 | France | 188/24 |
| 535319 | 4/1922 | France | 188/24 |
| 895661 | 1/1945 | France | 188/24 |
| 1112316 | 3/1956 | France | 188/24 |

*Primary Examiner*—Jeffrey V. Nase
*Attorney, Agent, or Firm*—Armstrong, Nikaido, Marmelstein & Kubovcik

[57] ABSTRACT

In a caliper type brake for bicycles, a coil spring is inserted between the connecting portions of a Bowden cable at ends of opposite brake blocks formed in horseshoe-shape so as to drive both blocks in stretched state. A limiting tool is fitted to a through bolt for pivoting both blocks so as to define the turned position of both blocks, and a spanner-attaching tool is also fitted to the through bolt so as to adjust the turned position of the bolt.

1 Claim, 8 Drawing Figures

CALIPER TYPE BRAKE FOR BICYCLES

BACKGROUND OF THE INVENTION (1) Field of the Invention

The present invention relates to caliper type brakes for bicycles, and more particularly to a caliper type brake which can be operated by a small operating force and in which clearance between a brake rubber and a rim is adjusted by means of a limiting tool and a spanner-attaching tool, both tools being fixed on a through bolt connecting opposite brake blocks.

(2) Description of the Prior Art

A conventional caliper type brake for bicycles is constituted as illustrated in FIGS. 1 and 2. There is shown a brake comprising a left block 1 and a right block 2 which are pivotably connected by a through bolt 3 with washer 4 and 5, and it is driven in opening direction by a return spring 14 arranged along the opposite blocks 1, 2. Referring to FIG. 3, the through bolt 3 consists of bolt portions 9, 9' and a collar 10. The left block 1 and the right block 2 are attached to the bolt portion 9 through a washer 6, a nut 7 and a locknut 8. The through bolt 3 is attached to a bicycle frame (not shown) at the bolt portion 9' through washers 11, 11 and is fixed by a washer 12 and nut 13. The collar 10 is provided with a groove 15 to which the center horizontal portion of the return spring 14 is fitted and supported. Both ends of the return spring 14 are attached respectively to the inside of spring supports 1', 2' connected to the left block 1 and the right block 2 by means of spot welding, so that both blocks 1, 2 are stretched outwards. Ends of the left block 1 and the right block 2 are respectively provided with brake rubbers 16, 16'. A wire clamping screw 17 is attached to the other end of the left block 1; an adjusting screw 19 is attached to the other end of the right block 2 through an attaching tool 18 for adjusting screw. An outer wire 21 of a brake-operating Bowden cable 20 is supported to the upper end of the adjusting screw 19, and an inner wire 22 thereof is fixed by inserting the lower end to the wire clamping screw 17.

After the caliper type brake constituted as above is attached to a bicycle frame, the inner wire 22 is pulled by operating a brake lever (not shown) fixed to a handle and the brake rubbers 16, 16' are pushed to a rim so that the brake action is effected. In this case, the left block 1 and the right block 2 are pivoted inwards against the bending spring force at both ends of the return spring 14, therefore the brake operation is difficult if the spring force of the return spring is too strong. Also when a general-purpose caliper type brake is attached to bicycles for children, the operation is difficult for most children.

SUMMARY OF THE INVENTION

An object of the present invention is to provide a caliper type brake for bicycles wherein the brake operation can be effected by a small operating force.

Another object of the present invention is to provide a caliper type brake for bicycles wherein the brake is easily manufactured and suitable for mass production of products of equal quality at reduced cost.

The present invention is characterized in the constitution that, in place of a conventional return spring, a coil spring is inserted between an attaching portion for wire clamping screw at one end of the left block and an attaching tool for adjusting screw at one end of the right block, so that other ends of both blocks are driven into stretched state and clearance in right and left brake rubbers is opened, and at the brake operation the coil spring is pressed so as to pivot the right and left blocks.

The above and further objects and features of the present invention will become obvious from the following description taken in connection with the accompanying drawings. It is to be understood, however, that the drawings are for purpose of illustration only and are not intended as a definition of the limits of the invention.

DESCRIPTION OF THE PREFERRED EMBODIMENT

Referring to the attached drawings, an embodiment of the present invention will be explained as follows.

Figure 1:
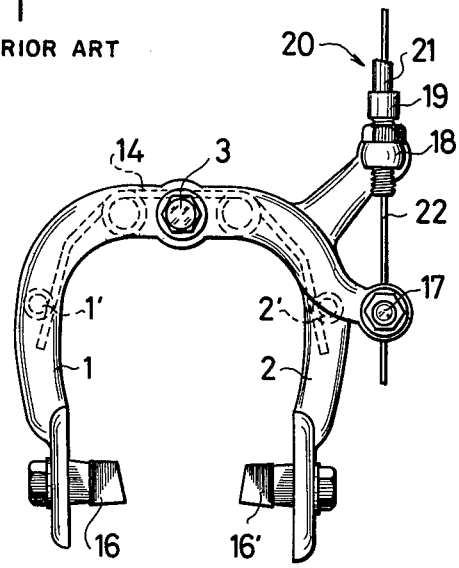
FIG. 1 is an elevational view of a caliper type brake for bicycles in prior art.
Figure 2:
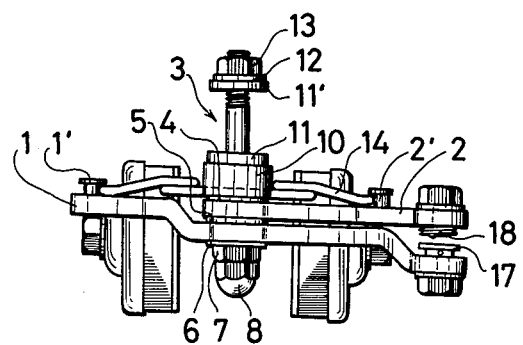
FIG. 2 is a plan view of the caliper type brake in FIG. 1.
Figure 3:
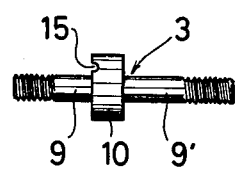
FIG. 3 is a side view of a through bolt 3 in prior art.
Figure 4:
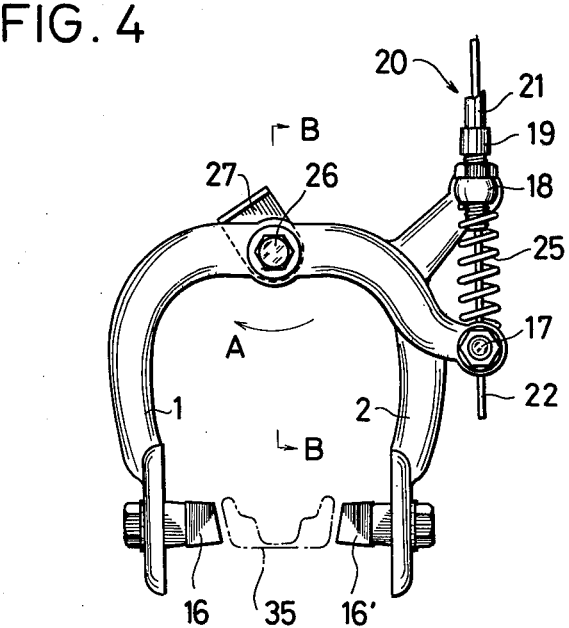
FIG. 4 is an elevational view of a caliper type brake for bicycles of the present invention.
Figure 5:
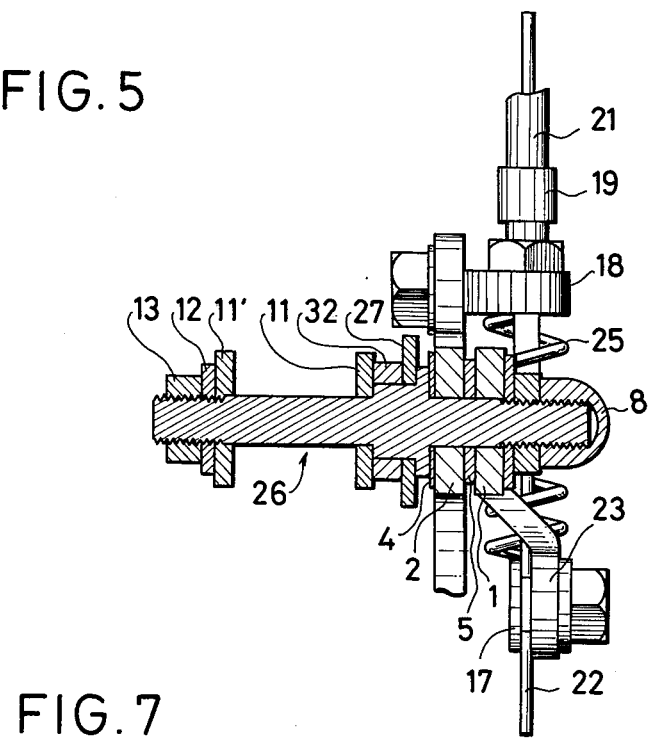
FIG. 5 is a sectional view taken on the line B—B of FIG. 4.
Figure 7:
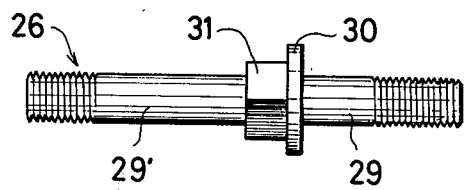
FIG. 7 is an elevational view of a through bolt 26 of the present invention.
Figure 8:
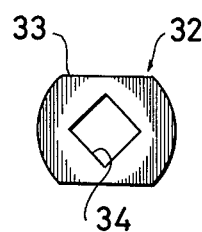
FIG. 8 is an elevational view of a spanner-attaching tool 32 of the present invention.
Figure 6:
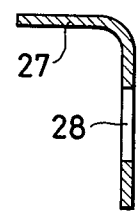
FIG. 6 is a sectional view of a limiting tool 27.

In FIG. 4, a caliper type brake for bicycles comprises a left block 1 and a right block 2 pivotably connected by a through bolt 26 at the center. Brake rubbers 16, 16' are respectively attached to the lower ends of the blocks 1, 2. A wire clamping screw 17 is attached to the other end of the left block 1 through an attaching portion 23 for wire clamping screw, and an inner wire 22 is inserted to the wire clamping screw 17 and fixed. An adjusting screw 19 is attached to the upper end of the right block 2 through an attaching tool 18 for adjusting screw, and an outer wire 21 of a brake-operating Bowden cable 20 is inserted to the upper end of the adjusting screw 19 and fixed. An inner wire 22 thereof penetrates the adjusting screw 19 and is fixed to the wire clamping screw 17. A coil spring 25 is so arranged to embrace the inner wire 22 between the attaching portion 23 for wire clamping screw and attaching tool 18 for adjusting screw, and it normally drives the left and right blocks 1, 2 into stretched state. The opposite blocks 1, 2 are free to rotate. Being installed to a bicycle, the brake as a whole is apt to turn in the "A" direction according to the weight of parts and the spring force on the Bowden cable 20. A limiting tool 27 fitted to a through bolt 26 is installed so as to limit the above-mentioned motion of the brake. Referring to FIG. 6, the limiting tool 27 is made by bending a thin copper sheet and acts as one body with the through bolt 26 by a square hole 28. Referring to FIG. 7, the through bolt 26 consists of bolt portions 29, 29', a flange 30 and a square head 31. The opposite blocks 1, 2 are attached to the bolt portion 29 through the washers 4, 5. The limiting tool 27 and a spanner-attaching tool 32 are attached to the square head 31. Referring to FIG. 8, the spanner-attaching tool 32 has a spanner-attaching portion 33 in opposite surfaces and acts as one body with the through bolt 26 by a square hole 34. A special spanner is attached to the spanner-attaching portion 33 to turn the through bolt 26 together with the limiting tool 27. The caliper type brake is installed to a bicycle frame (not shown) by the bolt portion 29' of the through bolt 26 through the washers 11, 11'. After tightening the brake temporarily with the washer 12 and the nut 13, the inner wire 22 inserted to the wire clamping screw 17 is pulled to adjust the clearance in the brake rubbers 16, 16' suitably and then the wire clamping screw 17 is fixed. The brake as a whole turns in the arrow "A" direction as above described, and the upper edge of the left block 1 abuts to the bent portion of the limiting tool 27. The through bolt 26 is turned by the spanner-attaching tool 32 thereby the limiting tool 27 is turned to push, for example, the upper edge of the left block 1, so that the clearance from the brake rubber 16 to the rim 35 becomes equal to that from the rubber 16' to the rim 35. And then the through bolt 26 is fixed to the frame thereby the assembling is finished.

If the inner wire 22 is pulled in the operation of the brake, the left block 1 is turned and one end thereof presses the coil spring, thereby the brake rubbers 16, 16' are pushed to the rim 35 so as to effect the brake action.

As above described, in the caliper type brake according to the present invention, since the coil spring is used to turn the both blocks in place of the conventional return spring, the present invention has the effect that the brake can be operated by a small operating force, that the spring force can be relatively freely set without necessity of machining the spring support of both blocks and the groove of the collar of the through bolt as is the case in conventional return spring, and that the brake can be easily manufactured with small variation of the quality and at the cost reduction.

I claim:

1. A caliper type brake for bicycles comprising opposite left and right brake blocks formed in horseshoe-shape, a through bolt pivotally connecting said blocks at the centers of said blocks, brake rubbers attached to opposite ends of both blocks, a Bowden cable having an inner wire and an outer wire installed at other ends of both blocks, a coil spring which is inserted between the connecting portion of the inner wire of the Bowden cable at the other end of said left block and the connecting portion of the outer wire at the other end of said right block to drive both blocks into stretched state, a limiting tool for defining a turned position of said opposite blocks, and a spanner-attaching tool for adjusting the turned position of the through bolt, said limiting tool and said spanner-attaching tool being fitted to said through bolt for pivoting both blocks at the center.

* * * * *